United States Statutory Invention Registration [19]

[11] Reg. Number: H542

Werkheiser, Jr. [43] Published: Nov. 1, 1988

[54] FIBER OPTIC VARIABLE FOCUS LENS

[75] Inventor: Arthur H. Werkheiser, Jr., Huntsville, Ala.

[73] Assignee: The United States of America as represented by the Secretary of the Army, Washington, D.C.

[21] Appl. No.: 170,497

[22] Filed: Mar. 23, 1988

[51] Int. Cl.[4] ..... G02B 6/06; G02B 6/04

[52] U.S. Cl. ..... 350/96.25; 350/96.24; 350/429

*Primary Examiner*—Stephen C. Buczinski
*Assistant Examiner*—Linda J. Wallace
*Attorney, Agent, or Firm*—John C. Garvin, Jr.; Freddie M. Bush; James T. Deaton

[57] ABSTRACT

Fiber optic variable focus lens in which a bundle of fibers are fixed at one end in a common plane and having another end of the fibers that is adjustable relative to a ring to allow said another end of the fibers to be adjusted to end in different planes and produce a lens. The lens can be varied and adjusted by utilizing adjusting mechanism for the fibers.

3 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

FIBER OPTIC VARIABLE FOCUS LENS

DEDICATORY CLAUSE

The invention described herein may be manufactured, used, or licensed by or for the Government for governmental purposes without the payment to me of any royalties thereon.

BACKGROUND OF THE INVENTION

In the past, fiber optics have been used to transmit light or information. Bundles of fiber optics have been used to transmit analog information (pictures). However, to date, fiber optic bundles have not been used to represent lenses, mainly because lenses are much more effective at focusing light.

Accordingly, it is an object of this invention to provide a fiber optic variable focus lens that can be used for laser surgery where one focus setting is used by the surgeon to observe within the human body and a second focus setting is used to focus laser light, also transmitted along fibers, on a particular spot for cutting and/or burning.

Another object of this invention is to provide second lens application that involves military laser optics in which adaptive optics are provided to overcome laser transmission problems through the atmosphere.

Still another object of this invention is to provide fiber optics variable lens that does not require that the ends of the fibers fit a prescribed regular curve, but have individual fibers that can have their end-point longitudinally displaced to provide corrections to a laser aperture wave front.

Other objects and advantages of this invention will be obvious to those skilled in this art.

SUMMARY OF THE INVENTION

In accordance with this invention, a fiber optic variable focus lens consists of a bundle of optical fibers held in a retaining ring on either end. One ring is fixed relative to the fibers and the fibers have sliding freedom in the other ring. Mechanical control of the slide position of individual fibers allows a wide variety of focus configurations for light transmitted through the fibers and exiting at the ring with sliding freedom.

DESCRIPTION OF THE PREFERRED EMBODIMENT

Figure 1:
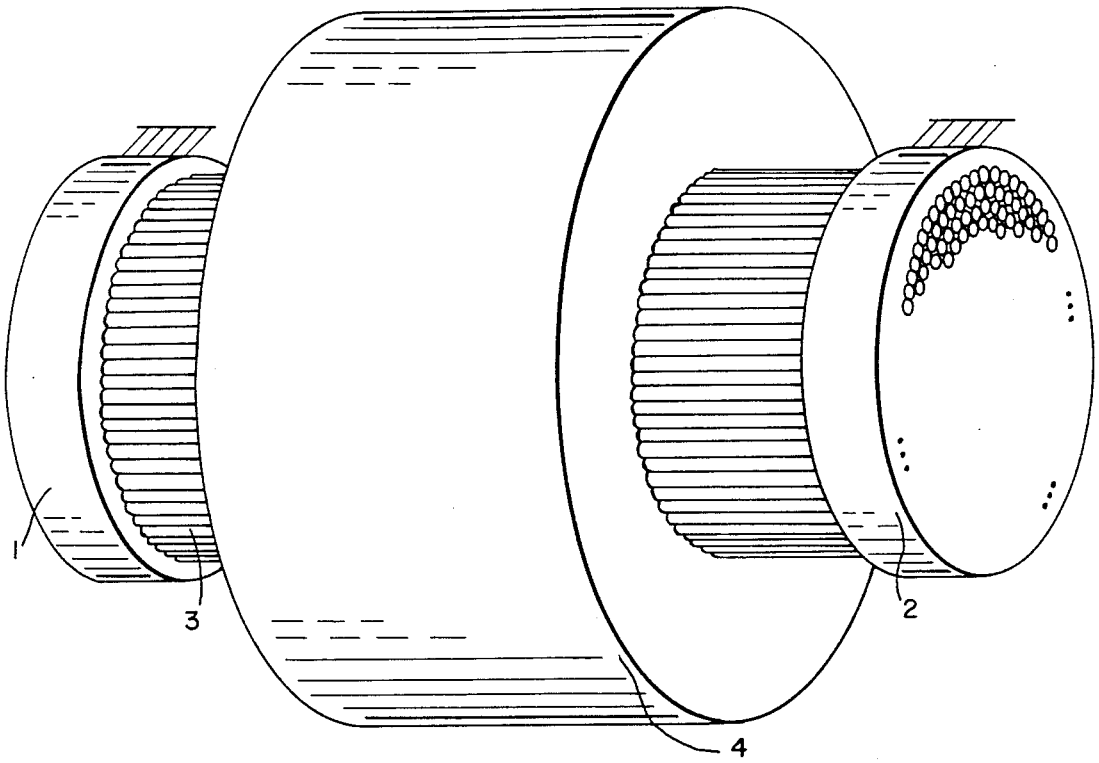
FIG. 1 is a perspective view of a fiber optics bundle in accordance with this invention.
Figure 2:
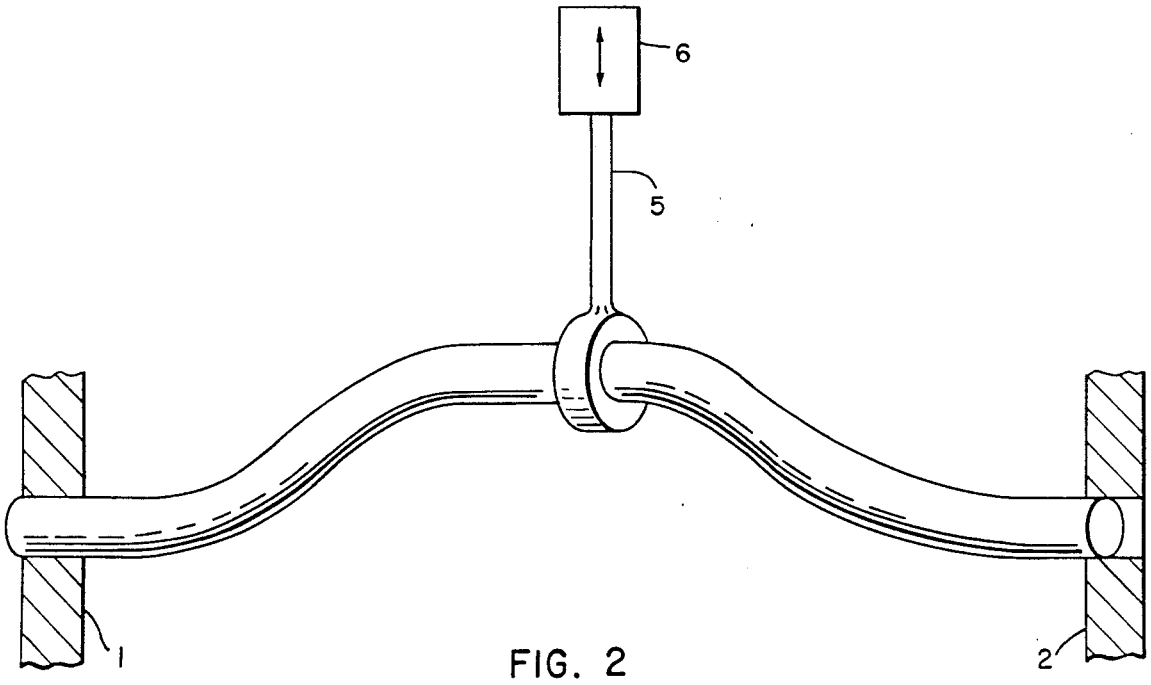
FIG. 2 is a schematic illustration of how individual fibers are adjusted relative to one end plate.

Referring now to the drawing, a bundle of optical fibers 3 is held in place at the ends by retaining rings 1 and 2. Ring 1 clamps the ends of optical fibers 3 to fix them in one position and allow no movement of the fiber ends at ring 1. The other ring 2 holds optical fibers 3 in such a way as to allow no radial movement at the optical face of the bundled fibers but to allow lengthwise movement of the individual optical fibers (i.e., movement perpendicular to the optical face). Each fiber's motion is individually controlled inside adjusting mechanism 4 such as a electromechanical adjusting mechanism. A representation of what occurs within this mechanism is shown schematically in FIG. 2. Actuation of rod 5 within electro-mechanical adjusting mechanism 6 causes the optical fiber to pull in from the face of retaining ring 2. One such control must exist for every fiber. The actual control of the adjusting motion can be accomplished by electromechanical means or computer control of such adjusting motion.

Fiber optic bundle 3 is composed of fibers of the same length. The ends fixed in retaining ring 1 are initially positioned during construction so that all the ends lie in the same plane i.e., the plane of the retaining ring edge. The fiber optic variable focus lens serves as simple light pipe of magnification 1. This is achieved by adjusting the displacement of each fiber so that the movable end of all fiber lies in the same plane within retaining ring 2. Since each fiber is of the same length as the next, a plane light wave entering fiber optic bundle 3 from the left will leave the bundle to the right, also as a plane wave. This is due to the absence of any curvature of the surface created by the ends of the fibers at retaining ring 2. Lenses achieve their focusing action by causing light rays that pass through the center of the lens to arrive at a particular plane in space at a later time than light rays that pass through the edges. This produces a converging action on rays that enter the lens initially as a parallel beam.

Figure 3:
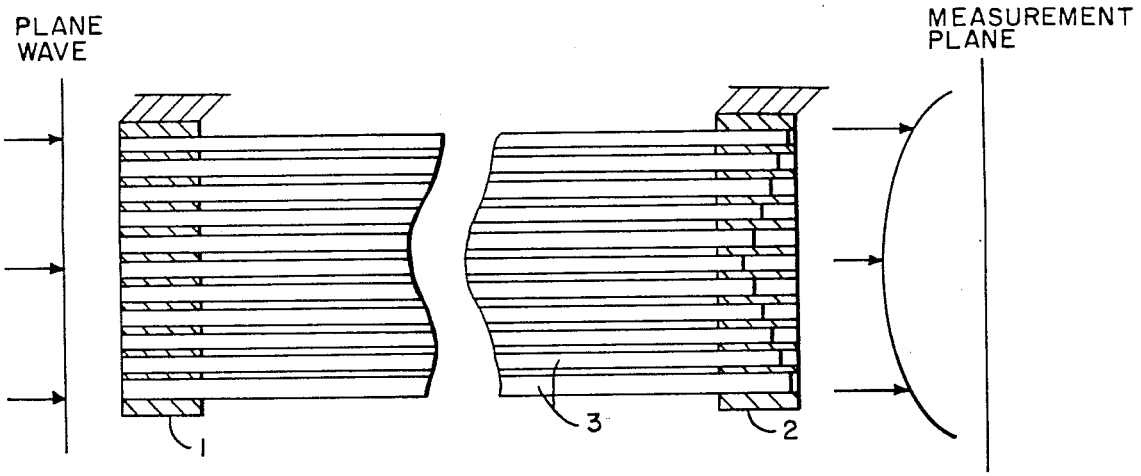
FIG. 3 is a sectional view and partially cutaway of a configuration of optical fibers which have been adjusted to have the effect of a convex lens.

With this fiber optic variable focus lens, light is constrained to pass through each fiber over the same time interval because each fiber is of the same length. The converging action is produced by varying the position of each fiber end in a symmetrical fashion. For a specifically symmetric lens action, the fiber end position should only be a function of radius r, the distance of the fiber end from the center of the bundle. FIG. 3 illustrates an example of converging lens action. Since the center rays must arrive at the plane of focus at the latest time, the center fiber end is farthest from the focal plane. On the other hand, the light rays that pass through the edges i.e., the top and bottom fibers, these fiber ends must be closest to the focal plane.

Figure 4:
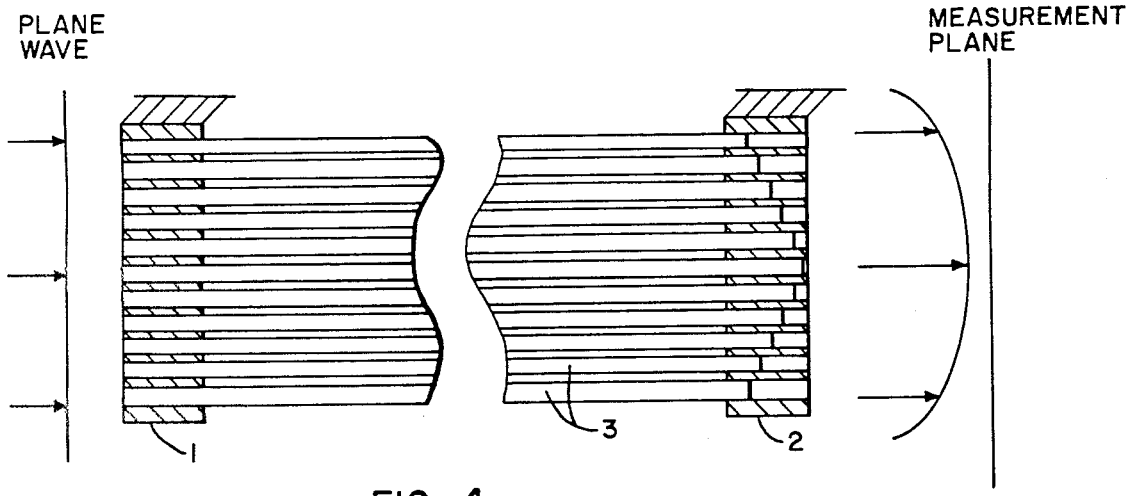
FIG. 4 is a sectional view and partially cutaway of a configuration of optical fibers which have been adjusted to have the effect of a concave lens.

Similarly, a diverging lens action is achieved by placing the fiber ends as shown in FIG. 4.

No mention has been made, thus far, of the number of fibers in the bundle, but the greater the number, the closer this discrete lens approaches its contingous analogue, the glass lens. With a greater number of optical fibers and the same form of electro-mechanical control of displacement as described above, this invention lends itself quite naturally to computer control. Furthermore, the lens action need not be spherical but may also be cylindrical or ellipsoidal, depending on the need. Ultimately, with computer control of the lens, adaptive optics applications occur, where individual fibers or sectors of fibers can be displaced to allow for atmospheric transmission anomalies.

I claim:

1. A fiber optic variable focus lens comprising a bundle of optical fibers of uniform length, rings mounted at opposite ends of the bundle, one of said rings being mounted at one of the ends of said optical fibers in a fixed relationship to the optical fibers to prevent movement of said one end of said optical fibers relative to said one of said rings, the other of said rings being mounted relative to the other end of said fibers for sliding longitudinal freedom of the other end of each fiber relative to said other of said rings to allow said fibers to be adjusted so as to be in different planes.

2. A fiber optic variable focus lens as set forth in claim 1, wherein adjusting mechanism is mounted relative to said fibers for adjusting said fibers relative to said other of said rings to adjust the focus of the variable focus lens.

3. A fiber optic variable focus lens as set forth in claim 2, wherein said adjusting mechanism is an electromechanical adjusting mechanism.

* * * * *